(No Model.)

F. WADSWORTH & H. N. PRENTICE.
GRAIN SEPARATOR.

No. 334,312.            Patented Jan. 12, 1886.

WITNESSES:

INVENTOR:
F. Wadsworth
H. N. Prentice
BY Munn & Co
ATTORNEYS.

UNITED STATES PATENT OFFICE.

FRANCIS WADSWORTH AND HENRY N. PRENTICE, OF VENICE, OHIO.

GRAIN-SEPARATOR.

SPECIFICATION forming part of Letters Patent No. 334,312, dated January 12, 1886.

Application filed April 24, 1885. Serial No. 163,307. (No model.)

*To all whom it may concern:*

Be it known that we, FRANCIS WADSWORTH and HENRY N. PRENTICE, both of Venice, in the county of Erie and State of Ohio, have invented certain new and useful Improvements in Grain-Separators, of which the following is a full, clear, and exact description.

Reference is to be had to the accompanying drawings, forming part of this specification, in which similar letters of reference indicate corresponding parts in both the figures.

Figure 1:
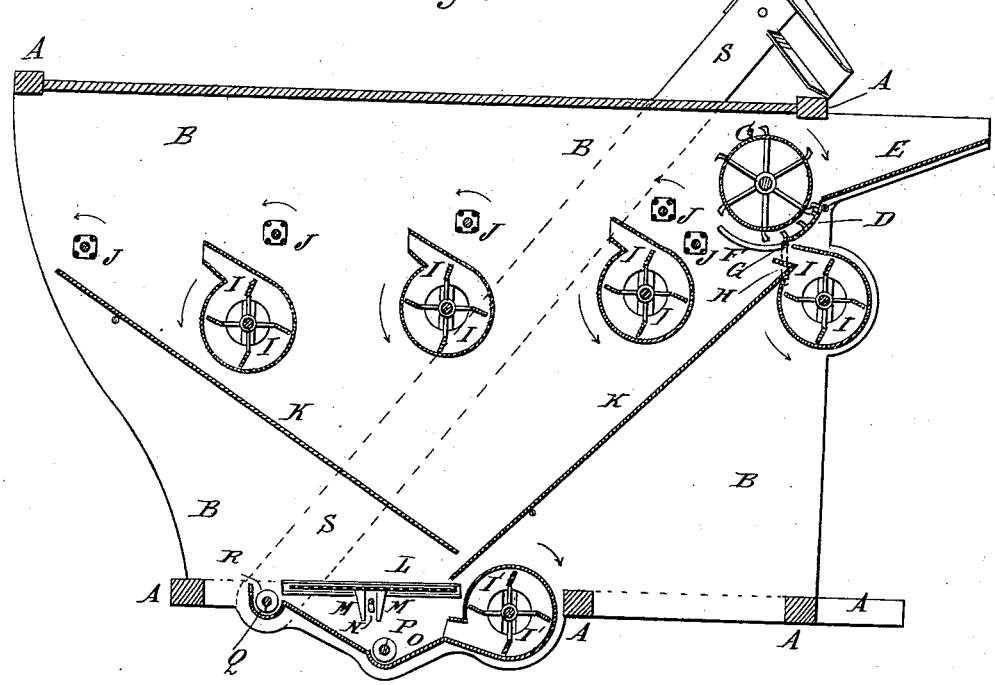
Figure 2:
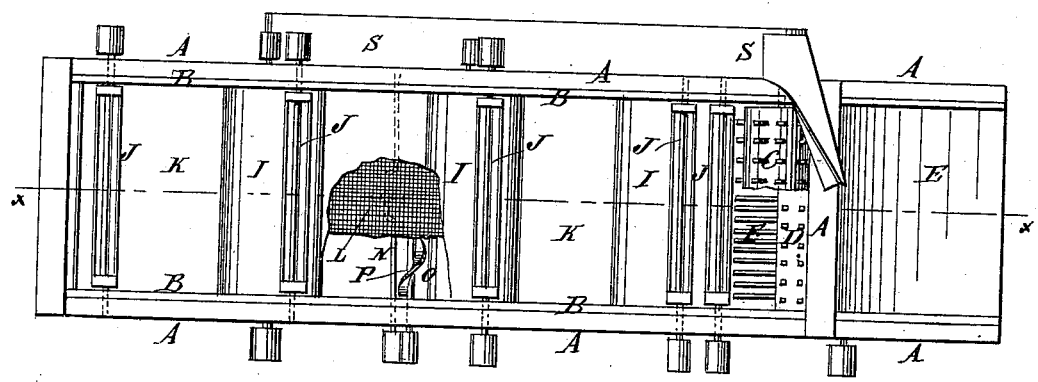

Figure 1 is a sectional side elevation of one of our improved machines, taken through the line x x, Fig. 2. Fig. 2 is a plan view of the same, the top of the casing being removed and parts being broken away.

The object of this invention is to provide combined grain thrashers, separators, and cleaners, constructed in such a manner as to separate the straw and chaff from the grain at the same time and then remove the unthrashed and partly-thrashed heads and heavy impurities that may have passed through the thrasher and separator with the grain.

The invention consists in the construction and combination of various parts of the machine, as will be hereinafter fully described, and then pointed out in the claim.

A represents the frame, and B the casing of the machine.

C is the cylinder, and D is the concave, to which the grain to be thrashed is fed from the feed-apron E in the ordinary manner.

F are curved guide-fingers, which are attached to a shaft, G, journaled to the frame A at the inner edge of the concave D, and which is provided with a crank-arm, H, at one end, as shown in dotted lines in Fig. 1, so that the said guard-fingers F can be adjusted closer to or farther from the cylinder C, as may be desired. The curved fingers F serve as guides to the straw as it issues from between the cylinder C and the concave D, and also serves as a screen to allow the thrashed grain to fall through and the air-blast to have free access to the said straw to blow away the chaff.

I are four or more fan-blowers placed in a row in the middle part of the machine, the first one of the series being placed beneath the concave D. The fan-blowers I are arranged with their discharge-spouts at their upper sides and inclined upward and rearward, so that the air-blasts from the said fan-blowers will blow the chaff out of the straw and back through the upper part of the machine, and will also assist in carrying the straw back through the machine.

At the inner ends of the guard-fingers F, and above the discharge-spouts of the fan-blowers I, except the first one, and at the rear end of the machine, are placed rotary beaters J, which are pivoted to the frame A of the machine, and by which the straw is carried back through the machine, and is shaken to cause the grain to drop from it as it passes back. As the grain falls from the straw it is received upon and slides down the inclined aprons K, secured in the forward and rear parts of the machine, escapes through the narrow space between the lower ends of the said inclined aprons K, and falls upon the inner part of the screen L, which slides in guides in the lower part of the machine, and has slotted lugs M attached to its lower side to receive the crank of the crank-shaft N, journaled to the lower part of the frame A, so that the said screen L will be shaken by the revolution of the said crank-shaft N. The screen L is made of such a fineness of mesh that the grain will pass through it and fall into the trough O, whence it is fed out into any suitable receiver by the feed-screw P, placed in the lower part of the said trough. The unthrashed and partly-thrashed heads of grain too heavy to be carried off by the air-blasts from the fan-blowers I will fall from the rear end of the screen L into the trough Q, whence they are fed out by the feed-screw R, placed in the lower part of the said trough into the well of the elevator S, by which they are carried up and discharged upon the feed-apron E, to again pass through the machine. The grain while passing through the screen L is subjected to a blast of air from a fan-blower, I', placed at the inner end of the screen L, and discharging an air-blast beneath the said inner end of the said screen.

To the shafts of the cylinder, fan-blowers, beaters, and feed-screws are attached pulleys to receive belts, so that the said beaters and feed-screws can be driven from the fan-blowers, and the said fan-blower can be driven from the said cylinder.

Having thus described our invention, what we claim as new, and desire to secure by Letters Patent, is—

In a grain thrasher and separator, the combination, with the frame and casing A B, the cylinder C, and the concave D, of the adjustable guide-fingers F, the series of fan-blowers I, and the series of rotary beaters J, substantially as herein shown and described.

FRANCIS WADSWORTH.
HENRY N. PRENTICE.

Witnesses:
CYRUS B. WINTERS,
LEWIS N. WEMER.